United States Patent Office 3,143,524
Patented Aug. 4, 1964

3,143,524
ORGANOPOLYSILOXANES CONTAINING SILI-
CON-BONDED CARBOXYALKYL RADICALS
Glenn D. Cooper and Maurice Prober, Schenectady, N.Y.,
assignors to General Electric Company, a corporation
of New York
No Drawing. Filed Aug. 22, 1955, Ser. No. 529,896
6 Claims. (Cl. 260—46.5)

This invention relates to liquid and solid organopolysiloxanes containing silicon-bonded carboxyalkyl radicals. More particularly, this invention is concerned with liquid and solid organopolysiloxanes having the average composition (1) 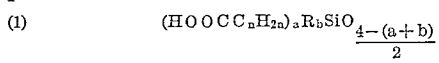

where the HOOC group is attached to a carbon atom other than a silicon-bonded carbon atom, R is a member selected from the class consisting of monovalent hydrocarbon radicals, for instance, alkyl radicals, e.g., methyl, ethyl, propyl, butyl, cyclohexyl, cycloheptyl, etc., radicals; aryl radicals, e.g., phenyl, diphenyl, naphthyl, tolyl, ethylphenyl, etc., radicals; aralkyl radicals, e.g., benzyl, xylyl, phenylethyl, etc., radicals; and haloaryl radicals, e.g., chlorophenyl, dibromophenyl, etc., radicals; $n$ is an integer equal to from 2 to 18, inclusive, and preferably from 2 to 5, inclusive; $a$ has a value of from 0.01 to 2.0; and the sum of $a+b$ is from 1.0 to 2.5, inclusive.

The preferred compositions of the present invention are those within the scope of Formula 1 in which R is methyl and $n$ is equal to 2.

Heretofore organopolysiloxanes containing carboxyalkyl radicals attached to silicon have been known. However, these compounds have been silanes containing no hydrolyzable groups attached to silicon or have been completely condensed disiloxanes, which necessarily contain the carboxylalkyl group at the end of the siloxane molecule. Because of the structure of these prior art materials, they have only limited utility and are completely unsatisfactory in applications requiring solubility of relatively high molecular weight siloxanes in aqueous solutions and in applications where it is desired to form high molecular weight organopolysiloxanes containing more than two silicon-bonded carboxyalkyl radicals per molecule.

We have discovered a new class of organopolysiloxanes described by Formula 1 which are not subject to the deficiencies of the prior art compounds and which are characterized by including both liquid and solid forms, by the ability of the liquid products to gel into a stable cross-linked product, by being soluble in alkaline aqueous solutions, and by including any desired number of carboxyalkyl radicals per molecule.

The products of the present invention may be prepared by a number of different methods. In the first of these methods, cyanoalkyl polysiloxanes, such as the compositions disclosed in the application of Maurice Prober and Glenn D. Cooper, Serial No. 401,701, filed December 31, 1953, and assigned to the same assignee as the present invention, may be hydrolyzed in an alkaline or acidic aqueous medium to convert the cyanoalkyl radicals attached to silicon to carboxyalkyl radicals. The cyanoalkyl polysiloxanes can be prepared by the hydrolysis of various silanes which contain both silicon-bonded chlorine atoms and silicon-bonded cyanoalkyl radicals.

The silanes containing both silicon-bonded chlorine and silicon-bonded cyanoalkyl radicals are prepared by the method disclosed in our copending application, Serial No. 401,704, the copending application of Maurice Prober Serial No. 401,702 (now U.S. 3,099,670, issued July 30, 1963), and the application of Quentin P. Cole, Serial No. 401,690 (now U.S. 2,776,306, issued January 1, 1957), the aforesaid applications being filed on December 31, 1953, and assigned to the same assignee as the present invention. For example, silanes containing a single cyanoalkyl radical and three chlorine atoms attached to silicon may be prepared by refluxing trichlorosilane, a trialkyl amine such as tri-n-butyl amine, and a suitable nitrile containing an olefinic unsaturation. Suitable nitriles include, for example, methacrylonitrile, α-ethylacrylonitrile, crotononitrile, acrylonitrile, etc. These compounds containing three chlorine atoms attached to silicon may be converted to compounds containing only two chlorine atoms attached to silicon by a Grignard synthesis or by reaction with a dialkyl cadmium. For example, methyl-β-cyanoethyldichlorosilane may be prepared by refluxing β-cyanoethyltrichlorosilane with methyl magnesium bromide. The same compound may also be prepared by reacting β-cyanoethyltrichlorosilane with dimethyl cadmium.

Cyanoalkyl organopolysiloxanes having the recurring unit of the formula

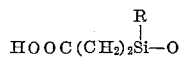

where R is a monovalent hydrocarbon radical, can be prepared from the silanes just described by a conventional method which comprises hydrolyzing various cyanoalkylsilanes by the method disclosed in the aforementioned Prober and Cooper application. Thus, a cyanoalkyl organopolysiloxane fluid may be prepared by hydrolyzing a compound such as methyl-β-cyanoethyldichlorosilane by agitating the silane for several hours in water or a mixture of ether and ice. Other cyanoalkyl organopolysiloxane fluids may be prepared by cohydrolyzing compounds such as β-cyanoethyltrichlorosilane and dimethyldichlorosilane and trimethylchlorosilane with water until the liquid organopolysiloxane is formed.

Additional cyanoalkyl organopolysiloxanes can be prepared from the cyanoalkyl organopolysiloxanes by the general method described in Patnode Patent 2,469,890. This method comprises equilibrating a mixture of completely condensed, relatively low molecular weight organopolysiloxane compounds with sulfuric acid. This mixture consists of at least one cyanoalkyl organopolysiloxane such as β-cyanoethylheptamethylcyclotetrasiloxane, or a linear chain-stopped compound such as bis-β-cyanoethyltetramethyldisiloxane or β-cyanoethylheptamethyltrisiloxane. This mixture can also contain alkyl or aryl or mixed alkyl aryl polysiloxanes, such as cyclic or linear chain-stopped organopolysiloxanes, including, e.g., octamethylcyclotetrasiloxane, hexamethyl disiloxane, 3-phenyl heptamethyltrisiloxane, and the methyl chlorophenyl siloxanes disclosed in Burkhard Patent 2,689,859. The equilibration is carried out by contacting the mixture of organopolysiloxanes with about 5 percent by weight of concentrated sulfuric acid, based on the weight of the total organopolysiloxanes, and the mixture is shaken at room temperature for several hours. At the end of this time a rearrangement and condensation of the various organopolysiloxanes has taken place to form new cyanoalkyl organopolysiloxanes.

In the hydrolysis of cyanoalkyl organopolysiloxanes to the corresponding carboxyalkyl organopolysiloxanes, the amount of acid or base employed is not critical since the acid or base acts only as a catalyst. However, for convenience we prefer to employ relatively large amounts of the acid or base since the hydrolysis reaction is speeded up thereby. Thus, satisfactory hydrolysis of the cyanoalkyl cyclopolysiloxanes has been obtained using from 0.1 to 20 or more equivalents of acid or base per cyanoalkyl group. The concentration of the acid or base is also unimportant to the preparation of the products of this invention. However, we have found that the stronger acids and bases tend to speed up the rate of reaction. Thus, the hydrolysis has been carried out employing aqueous sulfuric acid containing from 6 to 96 percent by weight of sulfuric acid. The reaction has been carried out with alkaline reaction media employing aqueous solutions of alkali containing from 5 to 50 percent of the alkali in the aqueous solution.

Among the acids suitable for the hydrolysis of the present invention may be mentioned sulfuric acid, hydrochloric acid, phosphoric acid, nitric acid, acetic acid, etc. Satisfactory alkaline solutions for the hydrolysis include those containing alkali-metal hydroxides such as sodium hydroxide, potassium hydroxide, as well as alkaline earth hydroxides such as calcium hydroxide, etc. The temperature at which the hydrolysis is carried out may vary from room temperature (about 25° C.) up to temperatures of from 100–120° C. Preferably, elevated temperatures such as from 80–100° C. are employed to increase the rate of the hydrolysis reaction. In general, when employing favorable hydrolysis conditions, the hydrolysis reaction is completed within a few hours. However, it is generally desirable to maintain the reactants at an elevated temperature for periods up to 10 or more hours to insure complete hydrolysis.

After completion of the hydrolysis it is desirable to neutralize the hydrolysis mixture with acid or a base as required and wash the resulting liquid or solid carboxyalkylorganopolysiloxane with water to remove all traces of the acids and bases employed.

A second method of preparing the compositions of the present invention is by the hydrolysis in alkaline solution of a chlorosilane containing both cyanoalkyl radicals and chlorine atoms bonded to silicon. Thus, $\beta$-cyanoethyltrichlorosilane may be stirred in an aqueous sodium hydroxide solution at room temperature or a temperature up to 100° C. or more for several hours until hydrolysis of both the silicon-bonded chlorine atoms and the nitrile group is completed. The result of this hydrolysis is to condense the various cyanoalkylsilane compounds into an organopolysiloxane and also to hydrolyze the nitrile group to a carboxy group. In the case of $\beta$-cyanoethyltrichlorosilane, the product resulting from hydrolysis in an aqueous alkaline solution is a gel. In terms of Formula 1, the alkaline hydrolysis product of cyanoethyltrichlorosilane is described when $n$ equals 2, $a$ equals 1, and $b$ equals 0. Where it is desired to have other values for $a$ and $b$ within the scope of Formula 1, a plurality of chlorosilanes containing R groups, cyanoalkyl groups, and chlorine atoms attached to silicon may be hydrolyzed. Thus, products within the scope of the present invention may be prepared by cohydrolyzing mixtures of silanes such as $\beta$-cyanoethyltrichlorosilane, methylphenyldichlorosilane or dimethyldichlorosilane and trimethylchlorosilane. By varying the relative amounts of the three components of the hydrolysis mixture the final composition of the resulting cyanoalkyl organopolysiloxane may be controlled so that the value of $a$ and the sum of $a+b$ are within the scope of Formula 1. It is obvious that silanes other than those just described may also be cohydrolyzed with cyanoalkylchlorosilanes other than the particular compound claimed. Thus, the cyanoalkylsilane containing silicon-bonded chlorine atoms might be any of the compounds described in the aforementioned Prober application. These compounds include, for example, methyl-$\beta$-cyanoethyldichlorosilane, ethyl-$\beta$-cyanopropyldichlorosilane, dimethyl-$\beta$-cyanoethylchlorosilane, bis-($\beta$-cyanoethyl)-dichlorosilane, etc. Hydrolyzable silanes containing only R groups and chlorine atoms attached to silicon include, for example, trimethylchlorosilane, phenyldimethylchlorosilane, dimethyldichlorosilane, methyltrichlorosilane, phenyltrichlorosilane, chloro-methyltrichlorosilane, p-chlorophenyltrichlorosilane, etc. Included among these compounds are difunctional organopolysiloxanes free of carboxyethyl groups which have the siloxy unit formula $R_2SiO$ where R is a monovalent hydrocarbon radical.

The percentage of reactants employed and the reaction conditions employed in the alkaline aqueous hydrolysis of the cyanoalkyl chlorosilane and the other chlorosilanes are not critical. Thus, the amount of alkaline material present may vary within wide limits since this material is not a reactant but is only a catalyst. In practice, we prefer to employ about 2 to 5 moles of the alkaline material per mole of cyanoalkyl radicals. The preferred alkaline materials for the hydrolysis are the alkali-metal hydroxides, particularly sodium and potassium hydroxide. The temperature of the reaction may vary from room temperature up to a temperature of 100° C. or more. However, for convenience we prefer to employ temperatures in the range of 80–100° C. The material resulting from the hydrolysis of the cyanoalkyl chlorosilanes is the alkali metal salt of the desired carboxyalkyl organopolysiloxane. This salt may be converted to the acid by reaction with a stoichiometric amount of a suitable acid such as, for example, hydrochloric acid or sulfuric acid. After conversion to the carboxyalkyl organopolysiloxanes, the product is then recovered by washing or by distillation depending on the physical state of the product and its solubility in the neutralized reaction medium.

A third method of preparing products within the scope of the present invention, specifically those compositions in which the carboxyalkyl radical is $\beta$-carboxyethyl, is by the hydrolysis of trichlorosilylpropionyl chloride in an alkaline aqueous solution either with or without other halosilanes containing R groups attached to silicon by a silicon-carbon bond. The $\beta$-trichlorosilylpropionyl chloride is a product obtained in the addition of trichlorosilane to methylacrylate in the presence of a tertiary alkyl amine such as tri-n-butyl amine. The hydrolysis of this $\beta$-trichlorosilylpropionyl chloride with or without other chlorosilanes is carried out in the same manner as the alkaline aqueous hydrolysis of the cyanoalkyl chlorosilanes previously described.

The following examples are illustrative of the practice of the present invention and are not intended for purposes of limitation.

*Example 1*

This example describes the preparation of a liquid methyl-$\beta$-carboxyethyl organopolysiloxane by the hydrolysis of a cyanoalkyl organopolysiloxane in an aqueous alkaline solution. Methyl-$\beta$-cyanoethyldichlorosilane was prepared by the method described in our aforementioned copending application Serial No. 401,704. Forty-seven grams of this compound was dissolved in 300 ml. of diethyl ether and stirred for two hours with 50 grams of ice. An oil layer which formed was then separated from the ethereal and aqueous phases and subsequently devolatilized by heating at 200° C. at 0.8 mm. for 4 hours. The resulting cyanoethylmethyl organopolysiloxane fluid had a viscosity of 6800 centistokes at 25° C. and was comprised principally of recurring methyl-$\beta$-cyanoethylsiloxane units. Two grams of this oil was refluxed for 24 hours with 50 ml. of 5 percent aqueous sodium hydroxide solution. This solution was then acidified with sulfuric acid to yield a very viscous organopolysiloxane fluid comprising principally methyl-$\beta$-carboxyethylsiloxane units. This oil was readily soluble in a 10 percent aqueous sodium hydroxide solution.

*Example 2*

This example illustrates the hydrolysis of a methyl-$\beta$-cyanoethyl organopolysiloxan fluid in an aqueous acid solution. Ten grams of the methyl-$\beta$-cyanoethyl oil prepared in Example 1 was dissolved in 20 ml. of 96 percent sulfuric acid and warmed for 1½ hours on a steam bath. The solution was then poured into 100 ml. of water and an oil phase separated. The oil prepared in this example was heated for 1 hour at 150° C. to form a clear gum which was soluble in a 10 percent aqueous sodium hydroxide solution. The neutralization equivalent of this gum was found to be 130 as compared with the theoretical value of 132 for gum made up of methyl-β-carboxyethylsiloxane units.

Examples 3 to 5 which follow describe the preparation of several organopolysiloxanes containing methyl and β-carboxyethyl radicals attached to silicon. These fluids were prepared from β-trichlorosilylpropionyl chloride, dimethyldichlorosilane, and trimethylchlorosilane.

*Example 3*

A solution of 148.3 grams of tri-n-butyl amine, 1.0 grams p-quinone, 0.5 grams p-t-butyl catechol in 689 grams of methyl acrylate was added to 1084 grams of trichlorosilane over a 3 hour period. This solution was refluxed for 43 hours during which time the reaction temperature rose from 50° C. to 92° C. After the reaction mixture had cooled, 30 grams of hydrogen chloride were passed into the reaction mixture and the mixture was distilled. This resulted in the isolation of β-trichlorosilylpropionyl chloride which boiled at 101–108° C. at 52 mm. Chemical analysis of this product showed the presence of 61.2 percent by weight of chlorine as compared with the theoretical value of 61.8 percent chlorine. A solution of 370.0 grams (3.0 moles) of dimethyldichlorosilane, 43.4 grams (0.40 mole) of trimethylchlorosilane and 85.9 grams (0.38 mole) of β-trichlorosilylpropionyl chloride was added to 2 liters of water and the mixture was stirred for four hours. Benzene was then added to aid in breaking an emulsion which formed and the benzene solution was then washed three times with water and dried over calcium chloride. The solvent was then removed and the residue was devolatilized at 170° C. for 1 hour at 1 mm. After filtration, a methyl-β-carboxyethyl organopolysiloxane fluid had been obtained which had an equivalent weight of 822 grams and which contained a ratio of β-carboxyethyl groups to silicon of 1:10. This oil had a viscosity of 2074 centistokes at 100° F. and had a viscosity temperature coefficient of 0.87. The density of this oil was 1.035. This oil was found to be slightly soluble in an aqueous sodium hydroxide solution. Upon heating at 200° C. for 4 hours, this oil formed a clear, firm gel.

*Example 4*

Following the procedure of Example 3 an organopolysiloxane oil containing both methyl and β-carboxyethyl groups attached to silicon was prepared from 387.0 grams (3.0 moles) of dimethyldichlorosilane, 16.3 grams (0.15 mole) of trimethylchlorosilane, and 21.7 grams (0.096 mole) of β-trichlorosilylpropionylchloride. The resulting fluid had an equivalent weight of 1990 grams and a ratio of β-carboxyethyl groups to silicon atoms of 1:26. This oil had a viscosity at 100° F. of 335.8 centistokes, a viscosity temperature coefficient of 0.77 and a density of 0.993. Like the oil of the preceding example, this oil was slightly soluble in an aqueous sodium hydroxide solution and formed a gel after being maintained in a circulating air oven for 4 hours at 200° C.

*Example 5*

Following the procedure of Example 3, a liquid organopolysiloxane containing methyl and β-carboxyethyl groups which had an equivalent weight of 5090 and a ratio of β-carboxyethyl groups to silicon atoms of 1:68 was prepared from 387.0 grams (3.0 moles) of dimethyldichlorosilane, 3.3 grams (0.03 mole) of trimethylchlorosilane and 6.8 grams (0.03 mole) of β-trichlorosilylpropionyl chloride. This fluid had a viscosity at 100° F. of 167.6, had a viscosity temperature coefficient of 0.69, and a density of 0.982. Like the oils of Examples 3 and 4, this oil was slightly soluble in a 10 percent aqueous sodium hydroxide solution and gelled after being maintained for 4 hours in a circulating air oven at 200° C.

*Example 6*

This example describes the preparation of an organopolysiloxane within the scope of Formula 1 in which $n$ equals 2, $a$ equals 1 and $b$ equals 0. About 188.5 grams (1.00 mole) of β-cyanoethyltrichlorosilane was added with stirring to 2 liters of 10 percent aqueous sodium hydroxide and refluxed for 48 hours. After acidification of this product with hydrochloric acid to a pH of 4 a voluminous precipitate appeared due to the salting out effect of the sodium chloride. This precipitate was filtered off, stirred with 1.5 liters of water to remove the salt and refiltered. The solid product was then added to 2 liters of water and formed a homogeneous solution. A small portion of this solution was dried by heating at 155° C. for 66 hours in vacuum. This resulted in a solid which was ground to a fine powder, stirred with 600 ml. of ice water, filtered and dried by heating for 42 hours at 155° C. in a vacuum. The resulting product was an organopolysiloxane gel in which all of the valences of the silicon other than the valences satisfied by silicon-oxygen linkages were satisfied by β-carboxyethyl groups. This solid had an equivalent weight of 172 grams. This gel was soluble in a 10 percent aqueous sodium hydroxide solution, in water, and in dilute aqueous sulfuric acid solutions.

*Example 7*

This example describes the preparation of an organopolysiloxane within the scope of Formula 1 in which $n$ equals 2, $a$ equals 2, and $b$ equals 0. Bis-(β-cyanoethyl)-dichlorosilane is prepared by refluxing one mole dichlorosilane and two moles of acrylonitrile in the presence of tri-n-butyl amine as disclosed in our aforesaid copending application, Serial No. 401,704. About one part by weight of this bis-(β-cyanoethyl) dichlorosilane is then added to a mixture of about one part of ice in about seven parts of diethyl ether and the mixture is stirred for several hours. At the end of this time the oil layer which forms is separated from the ether and water to give an organopolysiloxane made up of bis-(β-cyanoethyl)-siloxane units. Upon acidification of one part of this siloxane with about 3 parts by weight of concentrated sulfuric acid, an alkali soluble organopolysiloxane is formed which consists principally of bis-(β-carboxyethyl)-siloxane units.

The organopolysiloxanes of the present invention are useful for many of the applications in which organopolysiloxanes containing only alkyl, aryl, or haloaryl radicals are useful. Thus, the liquid organopolysiloxanes within the scope of Formula 1 are useful as lubricants, particularly in applications where lubrication is desired over a wide temperature range. These compounds can be used as lubricants at temperatures as low as −40 to −50° C. up to room temperature. These fluids can also be used as hydraulic fluids in the typical hydraulic fluid applications. In addition, these fluids can be used as impregnating agents for fabrics to impart water repellancy.

These products can also be employed in applications which make use of their special properties. Thus, the organopolysiloxanes of the present invention, particularly those which are fluid, are extremely valuable for use in potting electrical equipment. Thus, where it is desired to pot a product such as a transformer or a fluorescent lamp ballast, the product is merely placed in a vessel containing a fluid within the scope of Formula 1 and heated to a temperature of 150–200° C. The carboxyalkyl organopolysiloxane will then gel to give a product which is completely impregnated with and encased by a solid organopolysiloxane. Because of their gelling properties, fluids within the scope of Formula 1 may be applied as liquid films to a surface which is to be coated and insulated. The coated article is then brought to a temperature of 150–200° C. and the gelling of the organopolysiloxane results in a solid film of high temperature resistant insulating material on the article. Where it is desired to place an insulating film on articles which are not desirably subjected to high temperatures during the preparation of the article, a solution such as a neutral, or a hydrochloric acid solution of the gel described in Example 6 can be applied to the surface of the article. The article is then subjected to a vacuum to remove the solvent and to give an article coated with a continuous film of organopolysiloxane. The film obtained by this procedure is very hard and abrasion resistant.

What we claim as new and desire to secure by Letters Patent of the United States is:

1. A solid organopolysiloxane consisting of recurring structural units of the formula $$HOOCCH_2CH_2SiO_{3/2}$$

2. An organopolysiloxane composition selected from the class consisting of (a) a solid organopolysiloxane consisting of recurring structural units of the formula $$HOOCCH_2CH_2SiO_{3/2}$$

and (b) an organopolysiloxane consisting of units of the formula $$(CH_3)_3SiO_{1/2}, (CH_3)_2SiO, \text{ and } HOOCCH_2CH_2SiO_{3/2}$$

where the aforesaid three siloxy units are present in such a molar ratio that there are present from 0.03 mol to 0.40 mol trimethylsiloxy units, 3 mols dimethylsiloxy units, and from 0.03 to 0.38 mol carboxyethylsiloxy units.

3. A composition of matter composed of units of the formula $$(CH_3)_3SiO_{1/2}, (CH_3)_2SiO, \text{ and } HOOCCH_2CH_2SiO_{3/2}$$

where the aforesaid three siloxy units are present in such a molar ratio that there are present from 0.03 mol to 0.40 mol trimethylsiloxy units, 3 mols dimethylsiloxy units, and from 0.03 to 0.38 mol carboxyethylsiloxy units.

4. A copolymeric siloxane composed essentially of siloxane units of the formula $$HOOC(CH_2)_2\overset{R_b}{\underset{|}{Si}}O_{\frac{3-b}{2}}$$

and units of the formula $R_2SiO$ where R is a monovalent hydrocarbon radical and $b$ has a value equal to from 0 to 1, inclusive.

5. A polysiloxane consisting essentially of recurring units of the formula $$HOOC(CH_2)_2\overset{R}{\underset{|}{Si}}O$$

where R is a monovalent hydrocarbon radical.

6. A polysiloxane consisting essentially of recurring units of the formula $$HOOC-(CH_2)_2\overset{CH_3}{\underset{|}{Si}}-O$$

References Cited in the file of this patent
UNITED STATES PATENTS

| | | |
|---|---|---|
| 2,589,447 | Sommer | Mar. 18, 1952 |
| 2,601,237 | Barry et al. | June 24, 1952 |
| 2,721,856 | Sommer | Oct. 25, 1955 |
| 2,723,987 | Speier | Nov. 15, 1955 |